United States Patent Office 2,916,369
Patented Dec. 8, 1959

2,916,369

DIALLYLTHIOLCARBAMATES AND THEIR USE AS HERBICIDES

Harry Tilles, El Cerrito, and Joe Antognini, Mountain View, Calif., assignors to Stauffer Chemical Company, a corporation of Delaware No Drawing. Application September 26, 1956
Serial No. 612,115

10 Claims. (Cl. 71—2.7)

This invention relates to certain novel diallyl thiolcarbamates as compositions of matter and as herbicides. More specifically, the invention relates to compounds of the general formula

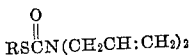

wherein R is a lower alkyl radical. The novel compounds of the present invention may be made in accordance with the following non-limiting examples. Code numbers have been assigned to each compound and are used throughout the balance of the application.

*Example 1—(R-2007).*—About 33.4 g. (0.337 mole) of di-allylamine was dissolved in 200 cc. of benzene and solution was cooled to 5° C. To this mixture was then added with stirring a solution of 20 g. (0.161 mole) of ethyl chlorothiolformate in 30 cc. of benzene over an interval of 24 minutes at 5-13° C. with ice cooling. The ice bath was then removed and the mixture was stirred for an additional 20 minutes. It was then filtered and the cake was washed with 2-50 cc. portions of benzene. The filtrate was evaporated on a steam bath and the residual liquid was fractionally distilled. There was obtained 24.77 g. (83.2% yield) of ethyl N,N-diallylthiolcarbamate, B.P. (30 mm.) 133-136.5° C.

*Example 2—(R-2016).*—About 15.0 g. (0.152 mole) of di-allylamine was dissolved in 100 cc. of ethyl ether and the solution was cooled to 5° C. To this mixture was then added dropwise a solution of 10 g. of n-propyl-chlorothiolformate in 20 cc. of ethyl ether. The mixture was filtered and the cake was washed with a small amount of ethyl ether. The filtrate was evaporated on a steam bath and the residual liquid was then fractionally distilled. There was obtained 11.02 g. (76.5% yield) of n-propyl N,N-diallylthiolcarbamate, B.P. (15 mm.) 132.0-132.2° C. The following analysis was obtained:

|  | Calculated for $C_{10}H_{17}NOS$ | Found |
|---|---|---|
| Percent C | 60.26 | 60.30 |
| Percent H | 8.60 | 8.44 |
| Percent N | 7.03 | 6.88 |
| Percent S | 16.09 | 15.98 |
| Molecular weight | 199 | 210 |

*Example 3—(R-2018).*—When the general procedure of Example 2 was repeated except that 15 g. (0.152 mole) of diallylamine and 11 g. (0.072 mole) of n-butyl chlorothiolformate were employed, there was obtained 12.98 g. (84.4% yield) of n-butyl N,N-diallylthiolcarbamate, B.P. (10 mm.) 136.5-138.0° C.

The compounds of the present invention have been tested as herbicides and found very effective as the following typical tests show. Some of the compounds are quite selective in their action and can be used to eradicate or control one type of plant, while another type of plant is relatively unaffected.

In making the following tests, seeds were planted in 3″ pots and shortly thereafter the compound under test was applied to the pots as a drench at the rate of 365 pounds per acre. The pots were placed in a greenhouse and watered at suitable intervals and the germination and growth of the seeds was compared with similarly planted seeds to which no herbicide was added. In each case, germination was reported on the scale of 0-100%, while growth was reported on a scale of 0-10, based on the seeds which germinated. Thus, 100-10 indicates normal germination and normal growth.

The following data were obtained:

| Compound | Oats | | Cucumbers | | Radish | |
|---|---|---|---|---|---|---|
|  | Percent Germ. | Growth | Percent Germ. | Growth | Percent Germ. | Growth |
| R-2007 | 0 |  | 0 |  | 0 |  |
| R-2016 | 0 |  | 0 |  | 10 | 0+ |
| R-2018 | 0 |  | 0 |  | 100 | 7 |

The above tests were then repeated using application rates of 10 and 40 pounds per acre with the following results:

| Compound | Lbs. Rate/Acre | Pea | | Corn | | Radish | | Rye | | Cucumber | |
|---|---|---|---|---|---|---|---|---|---|---|---|
|  |  | Germ. | Gr. | Germ. | Gr. | Germ. | Gr. | Germ. | Gr. | Germ. | Gr. |
| R-2007 | 10 | 100 | 4 | 100 | 10 | 100 | 10 | 0 |  | 30 | 1 |
|  | 40 | 90 | 3 | 100 | 10 | 100 | 10 | 0 |  | 0 |  |
| R-2016 | 10 | 50 | 1 | 90 | 10 | 100 | 10 | 0 |  | 40 | 5 |
|  | 40 | 0 |  | 80 | 8 | 100 | 10 | 0 |  | 10 | 0+ |
| R-2018 | 10 | 25 | 2 | 100 | 9 | 100 | 10 | 0 |  | 60 | 7 |
|  | 40 | 10 | 1 | 100 | 7 | 100 | 10 | 0 |  | 5 | 0+ |

The compounds of the present invention may be used as preemergence or postemergence herbicides and may be applied in a variety of ways at various concentrations. They may be combined with suitable carriers and applied as dusts, sprays or drenches. The amount applied will depend on the nature of the seeds or plants to be controlled and the rate of application may vary from 1 to 500 pounds per acre. One particularly advantageous way of applying the compounds is as a narrow band along a row crop, straddling the row.

We claim:
1. The method of combatting weeds comprising applying a phytotoxic amount of a compound to the soil, said compound having the formula

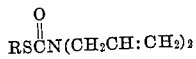

wherein R is a lower alkyl radical.
2. The method of claim 1 wherein the compound is applied as a narrow band to a row crop.
3. The method of claim 1 wherein the compound is applied at a rate of from 1 to 500 pounds per acre.
4. The method of claim 1 wherein the compound is ethyl N,N-diallylthiolcarbamate.
5. The method of claim 1 wherein the compound is n-propyl N,N-diallylthiolcarbamate.

6. The method of claim 1 wherein the compound is n-butyl N,N-diallylthiolcarbamate.

7. As a new composition of matter

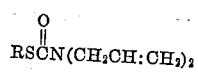

wherein R is a lower alkyl radical.

8. As a new composition of matter ethyl N,N-diallylthiolcarbamate.

9. As a new composition of matter n-propyl N,N-diallylthiolcarbamate.

10. As a new composition of matter n-butyl N,N-diallylthiolcarbamate.

References Cited in the file of this patent

UNITED STATES PATENTS

| | | |
|---|---|---|
| 2,060,733 | Hunt et al. | Nov. 10, 1936 |
| 2,160,880 | Loane et al. | June 6, 1939 |
| 2,562,011 | Baumgartner | July 24, 1951 |
| 2,642,451 | Weijlard et al. | June 16, 1953 |
| 2,650,876 | Stewart | Sept. 1, 1953 |
| 2,687,348 | Kosmin | Aug. 24, 1954 |

OTHER REFERENCES

"Chemical Abstracts," vol. 5, 1911, pps. 1095 and 1096.

Riemschneider et al.: Monatschefte fur Chemie 84, 518–21 (1953).